United States Patent [19]

Horn et al.

[11] 4,221,822
[45] Sep. 9, 1980

[54] PROCESSED, FROZEN EAR OF CORN AND METHOD OF COOKING THE SAME

[75] Inventors: Herbert Horn; Helene Horn; Charles S. Horn; Joseph Horn, all of Mattoon, Ill.

[73] Assignee: Horn's Poultry, Inc., Mattoon, Ill.

[21] Appl. No.: 656,368

[22] Filed: Feb. 9, 1976

[51] Int. Cl.³ ............................................. A23L 1/212
[52] U.S. Cl. .................................... 426/438; 426/482; 426/484; 426/514; 426/524
[58] Field of Search ............... 426/100, 102, 143, 302, 426/438, 439, 514, 615, 481, 484, 509, 523, 524, 419, 618, 627, 441, 482, 483

[56] References Cited

U.S. PATENT DOCUMENTS

| 17,697 | 6/1857 | Rowe | 426/615 |
| 1,247,261 | 11/1917 | Goodrich | 426/524 |
| 2,219,777 | 10/1940 | Holloway et al. | 426/438 X |
| 2,612,453 | 9/1952 | Stahmer | 426/143 |
| 3,082,097 | 3/1963 | Haller | 426/524 X |
| 3,592,666 | 7/1971 | Butler | 426/524 X |

OTHER PUBLICATIONS

Given, *Modern Encyclopedia of Cooking*, vol. I, 1949, pp. 351 & 392.
*Foods of the World*—American Cooking, 1968, p. 38.

*Primary Examiner*—Arthur L. Corbin
*Attorney, Agent, or Firm*—Wegner, Stellman, McCord, Wiles & Wood

[57] ABSTRACT

A frozen ear of fresh corn having a passage in and extending along the majority of the length of the cob is cooked by introducing the ear into cooking oil at an elevated temperature.

2 Claims, 1 Drawing Figure

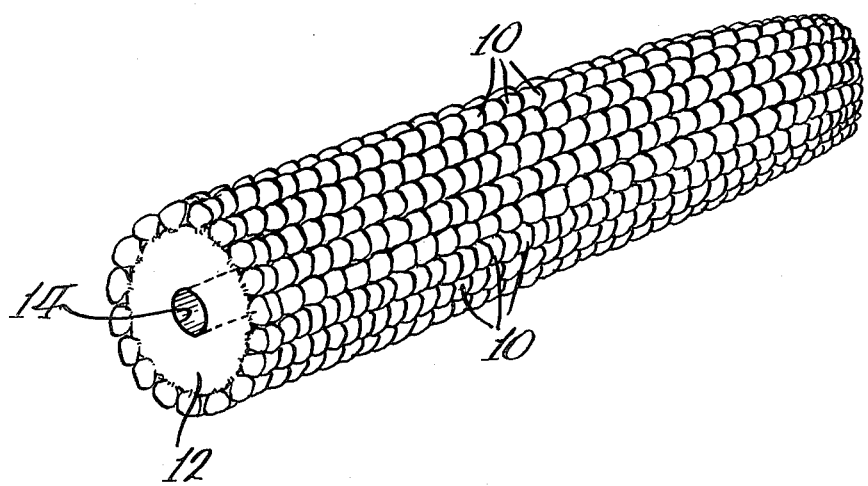

PROCESSED, FROZEN EAR OF CORN AND METHOD OF COOKING THE SAME

BACKGROUND OF THE INVENTION

This invention relates to processed foods and, more particularly, to processed frozen corn.

Many so-called "fast food" operations rely extensively upon the use of deep-fat cooking for rapidly heating and cooking food to be served to customers in a relatively short time. Heretofore, such operations have, in many practical respects, been unable to purvey cooked corn on the cob by reason of the relatively long time required to cook the same and the fact that if the cooked corn is permitted to stand, it tends to become mushy and unappetizing.

Attempts to overcome this difficulty by deep-fat frying fresh frozen corn have not been successful for the reason that if the frozen ear is deep-fat fried only sufficiently to cook the kernels, the cob remains substantially frozen and is accordingly quite unappetizing. Conversely, when it is attempted to cook the corn sufficiently to warm the cob, the kernals become burned in the cooking oil, again resulting in an unappetizing product.

SUMMARY OF THE INVENTION

It is the principal object of the invention to provide a new and improved processed frozen corn product. More specifically, it is an object of the invention to provide a corn product that is suitable for rapid preparation by deep-fat frying.

An exemplary embodiment of the invention achieves the foregoing object in a frozen ear of fresh corn having a passage in an extending along the majority of the length of the cob.

According to a preferred embodiment, the passage is a bore of at lest ⅛ inch in diameter and yet of sufficiently small size as not to appreciably weaken the cob to enable the ear to be manually grasped and consumed. The presence of the passage in the ear of corn permits the same to be rapidly cooked by deep-fat frying without scorching or burning the kernels while completely thawing and warming the cob.

A method of cooking frozen corn comprises the steps of providing a frozen ear of corn having an axial passage in its cob and introducing the ear into cooking oil at an elevated temperature.

Preferably, the corn is at a temperature in the range of about −15 to 10° F. and the cooking oil is maintained at a temperature in the range of 325°–375° F. The time of cooking is in the range of about 4–8 minutes.

Other objects and advantages will become apparent from the following specification taken in connection with the accompanying drawing.

DESCRIPTION OF THE DRAWING

The FIGURE is a perspective view of a frozen ear of corn made according to the invention.

DESCRIPTION OF THE PREFERRED EMBODIMENT

An exemplary embodiment of a processed frozen ear of corn made according to the invention is illustrated in the FIGURE and is seen to include a fresh ear of corn which has been husked to expose kernels 10 on a cob 12. The ear is frozen according to conventional techniques and it is contemplated that processing prior to freezing as, for example, blanching, may be employed.

The ear is provided with an axially extending passage in the form of a bore 14. The bore 14 extends along the vast majority of the length of the cob and may emerge from the opposite end if desired.

The bore 14 preferably is at least ⅛ inch in diameter and yet is sufficiently small as to not appreciably weaken the cob. That is, the bore 14 should not be so large that the cob would collapse when the ear is grasped in the hand of a consumer to be eaten.

In general, it is found that making the bore 14 ¼ inch in diameter is suitable.

The bore 14 may be formed in the ear either before or after freezing as desired by, for example, drilling.

In general, the ear will be maintained frozen at a temperature in the range of −15° F. to 10° F.

Depending upon the desires of the consumer, the ear may be coated with batter or be free from such coating.

To cook the ear, the same may be introduced into cooking oil at an elevated temperature, that is, deep-fat fried. Typically, the oil will be at a temperature in the range of 325° F.–375° F. and the ear will be maintained in such oil for a period of time in the range of 4–8 minutes.

In a highly preferred embodiment employing a cob having a ¼ inch bore, the same will be introduced into deep fat at a temperature of 350° F. for a period of 6 minutes.

The resulting product will have fully cooked kernels 10 that are not scorched or burned while the cob 12 will be completely thawed and warmed.

Without the bore 14, cooking of a frozen ear of corn would either result in the kernels being burned or scorched or the cob remaining in a frozen condition. In either case, the corn is unappetizing and unsuitable for sale to a consumer.

The use of the bore 14 in the ear makes it possible to have a highly desirable deep-fat fried ear of corn.

We claim:

1. The method of producing a corn food product which comprises forming an axial passage in and extending along the majority of the length of a husked ear of corn, freezing the ear of corn to a temperature of between −15° F. to 10° F., introducing the frozen ear of corn into a bath of cooking oil at a temperature in the range of about 325° F. to 375° F. and maintaining the ear in the bath for about 4 to 8 minutes.

2. The method of producing a corn food product which comprises forming an axial passage in and extending along the majority of the length of a husked ear of corn, freezing the ear of corn to a temperature of −15° F. to 10° F., and then introducing the frozen ear of corn into a bath of cooking oil maintained at a temperature of above 325° F. for a period sufficient to cook the corn for about 4 to 8 minutes.

* * * * *